United States Patent
Schlaufman et al.

(10) Patent No.: US 8,857,594 B2
(45) Date of Patent: Oct. 14, 2014

(54) FRICTION DRIVE CLUTCH HAVING RAMPED MEMBERS

(75) Inventors: Robert A. Schlaufman, Horseheads, NY (US); Brenton H. Barron, Corning, NY (US)

(73) Assignee: The Hilliard Corporation, Elmira, NY (US)

(*) Notice: Subject to any disclaimer, the term of this patent is extended or adjusted under 35 U.S.C. 154(b) by 184 days.

(21) Appl. No.: 13/561,591

(22) Filed: Jul. 30, 2012

(65) Prior Publication Data

US 2014/0027238 A1    Jan. 30, 2014

(51) Int. Cl.
  *F16D 13/42*    (2006.01)
(52) U.S. Cl.
  USPC .......................................... 192/93 A; 474/8
(58) Field of Classification Search
  CPC ........................................................ F16D 13/42
  USPC ........................................................ 192/70.24
  See application file for complete search history.

(56) References Cited

U.S. PATENT DOCUMENTS

| | | | | |
|---|---|---|---|---|
| 3,386,545 A | * | 6/1968 | Hansen ........................ | 192/93 A |
| 3,732,750 A | | 5/1973 | Posh | |
| 3,952,843 A | * | 4/1976 | Campbell et al. ............ | 188/72.7 |
| 3,979,963 A | * | 9/1976 | Goettl ............................... | 474/8 |
| 4,213,521 A | * | 7/1980 | Modersohn ................ | 192/93 A |
| 4,332,572 A | | 6/1982 | Carlson et al. | |
| 4,372,433 A | * | 2/1983 | Mitchell et al. ............. | 192/93 A |
| 5,002,259 A | | 3/1991 | Manning et al. | |
| 5,411,122 A | | 5/1995 | Uphaus | |
| 5,570,765 A | * | 11/1996 | Patridge ...................... | 192/93 A |
| 7,938,041 B1 | | 5/2011 | Shiigi et al. | |
| 8,235,183 B2 | * | 8/2012 | Dennis et al. ................ | 188/72.7 |
| 2013/0134006 A1 | | 5/2013 | Heath et al. | |
| 2013/0199886 A1 | | 8/2013 | Heath et al. | |

OTHER PUBLICATIONS

European Search Report, EP 13 17 7316, Oct. 29, 2013, 5 pages.
TB Wood's Incorporated, Clutch Products, 30 Pgs, Jul. 2007.

* cited by examiner

*Primary Examiner* — Rodney H Bonck
(74) *Attorney, Agent, or Firm* — Drinker Biddle & Reath LLP

(57) ABSTRACT

A friction drive clutch includes a hub, a thrust plate that rotates with and is axially slidable on the hub, a first housing rotatable with respect to the hub and including at least two first ramped members each having a sloped face, a second housing rotatable with respect to the thrust plate and axially movable together with the thrust plate, the second housing including at least two second ramped members each having a sloped face, a third housing rotatable with respect to the hub, and a spring assembly biasing the thrust plate and second housing axially toward the first housing, wherein when the second housing is rotated in one direction, the sloped faces of the first and second members slide over each other to urge the second housing and thrust plate axially in opposition to the spring assembly to bring the thrust plate into frictional engagement with the third housing.

13 Claims, 8 Drawing Sheets

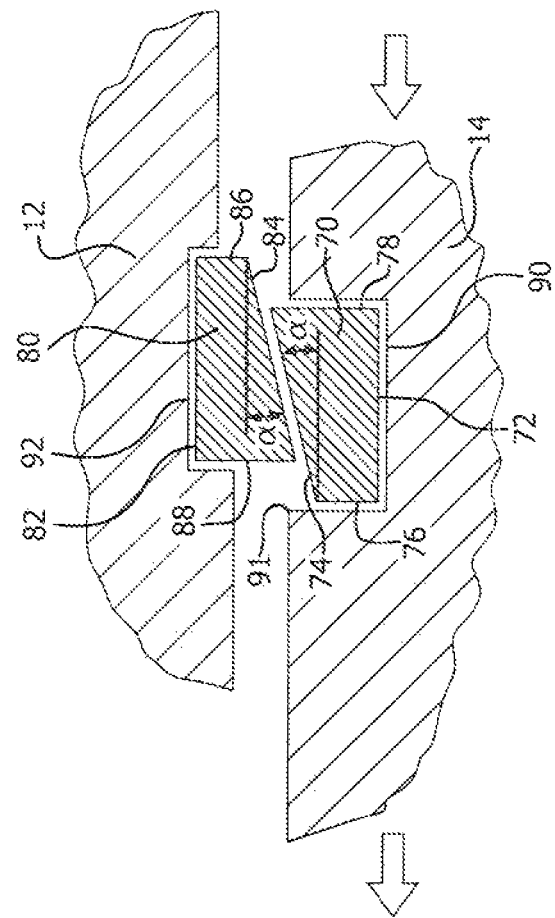
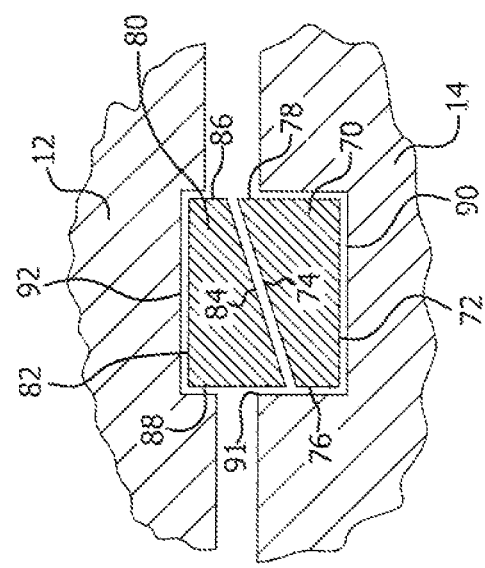
FIG. 6B
FIG. 6A

FRICTION DRIVE CLUTCH HAVING RAMPED MEMBERS

FIELD OF THE INVENTION

The invention relates to a clutch system, and in particular to a friction drive clutch having controlled manual engagement that automatically disengages when a manual actuating force is removed.

BACKGROUND

Many types of power equipment employ friction clutches between a drive mechanism (usually a gas or electric motor) and a driven mechanism (i.e., the functional part of the equipment). For example, friction clutches may be used in power trowels for smoothing concrete pads, the clutch being used to selectively engage and disengage the motor with the trowel blade to cause the blade to rotate or cease rotating, respectively. Similarly, friction clutches may be used in hydraulic pumps, stationary or trailer-mounted power units, portable sawmills, agricultural equipment, fans and blowers, and lawn and garden equipment.

In most of these cases, it is desirable to be able to control engagement of the clutch as the motor causes the driven mechanism to begin rotating from a stationary state. More importantly, it is often critical for the safety of an operator to be able to rapidly disengage the clutch to cease power input to the driven mechanism and allow the driven mechanism to stop rotating quickly. Further, it is preferable to have a clutch that is, by default, disengaged (i.e., it fails to a safe, disengaged state) to avoid the dangers that may be created should the drive mechanism be started while the clutch is engaged, which may cause the driven mechanism to start rotating unexpectedly.

For example, existing power trowels use a centrifugal clutch with a set throttle position. If the operator loses control of the trowel, or inadvertently releases the handle while the blade is engaged in smoothing concrete, the continued operation of the trowel may cause the handle to spin around and hit the operator with extreme force, causing severe injury or even death. Some power trowels include an inertia switch or operator presence switch to shut off the trowel should the operator lose control, but in many cases, trowels with such switches will continue to rotate, potentially striking the operator, when the operator loses control. Also, such switches can be, and often are, easily bypassed, so that if the operator loses control, the trowel will "helicopter" continuously until it runs out of gas or comes up a against a fixed object (e.g., a wall or a piece of heavy construction equipment) that retards or stops its motion.

SUMMARY

An embodiment of a friction drive clutch is described having a hub adapted to be engaged with and rotated about an axis by a drive mechanism and a thrust plate engaging the hub so as to rotate with the hub and to be slidable with respect to the hub in the axial direction. A first housing surrounds a portion of the hub, and the hub is rotatable with respect to the first housing. A second housing surrounds a portion of the hub and is located adjacent to the first housing. The thrust plate and the hub are rotatable with respect to the second housing, and the second housing is rotatable with respect to the first housing. The second housing engages the thrust plate so that the second housing and the thrust plate move axially together with respect to the hub during engaging and disengaging of the clutch. A third housing surrounds a portion of the hub and is rotatable with respect to the hub. The third housing is located adjacent to the thrust plate on an opposite side of the thrust plate from the second housing, and is adapted to be engaged with and to rotate a driven mechanism. A spring assembly urges the thrust plate and the second housing in the axial direction toward the first housing. At least two first ramped members extend axially from a surface of the first housing, each first ramped member having a sloped face. At least two second ramped members extend axially from a surface of the second housing, each second ramped member having a sloped face. Each second ramped member is at least partially aligned with a corresponding one of the first ramped members. When the second housing is rotated in one direction with respect to the first housing, the sloped faces of the second ramped members slide along the sloped faces of the corresponding first ramped members to urge the second housing in the axial direction away from the first housing, thereby causing the thrust plate to move axially into frictional engagement with the third housing. The axial movement of the thrust plate and the rotation of the second housing in the one direction is opposed by the spring assembly.

Another embodiment of a friction drive clutch is described including a hub having an axis and a thrust plate configured to rotate with the hub and to be axially slidable with respect to the hub. A first housing is configured to be rotatable with respect to the hub, the first housing including at least two first ramped members each having a sloped face. A second housing is configured to be rotatable with respect to the thrust plate and to move axially together with the thrust plate, the second housing including at least two second ramped members each having a sloped face. The second housing is positioned such that each second ramped member is at least partially aligned with a corresponding one of the first ramped members. A third housing configured to be rotatable with respect to the hub. A spring assembly urges the thrust plate and the second housing axially toward the first housing. When the second housing is rotated in one direction with respect to the first housing, the sloped faces of the second ramped members slide along the sloped faces of the corresponding first ramped members to urge the second housing in the axial direction away from the first housing, thereby causing the thrust plate to move axially into frictional engagement with the third housing. The axial movement of the thrust plate and the rotation of the second housing in the one direction is opposed by the spring assembly.

Another embodiment of a friction drive clutch is described having a hub adapted to be engaged with and rotated about an axis by a drive mechanism and a thrust plate engaging the hub so as to rotate with the huh and to be slidable with respect to the hub in the axial direction. A first housing surrounds a portion of the hub, and the hub is rotatable with respect to the first housing. A second housing surrounds a portion of the hub and is located adjacent to the first housing. The thrust plate and the hub are rotatable with respect to the second housing, and the second housing is rotatable with respect to the first housing. The second housing engages the thrust plate so that the second housing and the thrust plate move axially together with respect to the hub during engaging and disengaging of the clutch. A third housing surrounds a portion of the hub and is rotatable with respect to the hub. The third housing is located adjacent to the thrust plate on an opposite side of the thrust plate from the second housing, and is adapted to be engaged with and to rotate a driven mechanism. A spring assembly urges the thrust plate and the second housing in the axial direction toward the first housing. At least two first members extend axially from a surface of the first housing, and at least two second members extend axially from a surface of the second housing, each second member being at least partially aligned with a corresponding one of the first ramped members. A sloped axial face is formed on at least one of each first member and each second member for contacting the corresponding other member. When the second housing is rotated in one direction with respect to the first housing, the second members slide over the corresponding first members to urge the second housing in the axial direction away from the first housing, thereby causing the thrust plate to move axially into frictional engagement with the third housing, the axial movement of the thrust plate and the rotation of the second housing in the one direction being opposed by the biasing of the spring assembly.

Another embodiment of a friction drive is described including a hub having an axis and a thrust plate configured to rotate with the hub and to be axially slidable with respect to the hub. A first housing is configured to be rotatable with respect to the hub. A second housing is configured to be rotatable with respect to the thrust plate and to move axially together with the thrust plate. A third housing is configured to be rotatable with respect to the hub. A spring assembly urges the thrust plate and the second housing axially toward the first housing. One of the first housing and the second housing includes at least two sloped surfaces, and the other of the first housing and the second housing includes an axial surface configured to slide on the sloped surfaces. When the second housing is rotated in one direction with respect to the first housing, the axial surface of the other of the first housing and the second housing slides along the sloped surfaces of the one of the first housing and the second housing to urge the second housing in the axial direction away from the first housing, thereby causing the thrust plate to move axially into frictional engagement with the third housing, the axial movement of the thrust plate and the rotation of the second housing in the one direction being opposed by the spring assembly.

BRIEF DESCRIPTION OF DRAWINGS

For the purpose of illustrating the invention, there are shown in the drawings embodiments that are presently preferred; it being understood, however, that this invention is not limited to the precise arrangements and constructions particularly shown.

FIGS. 6A and 6B are cross-sectional views showing an embodiment of ramped members when a friction drive clutch as in FIG. 1 is in a disengaged position and an engaged position, respectively.

DETAILED DESCRIPTION

Figure 1:
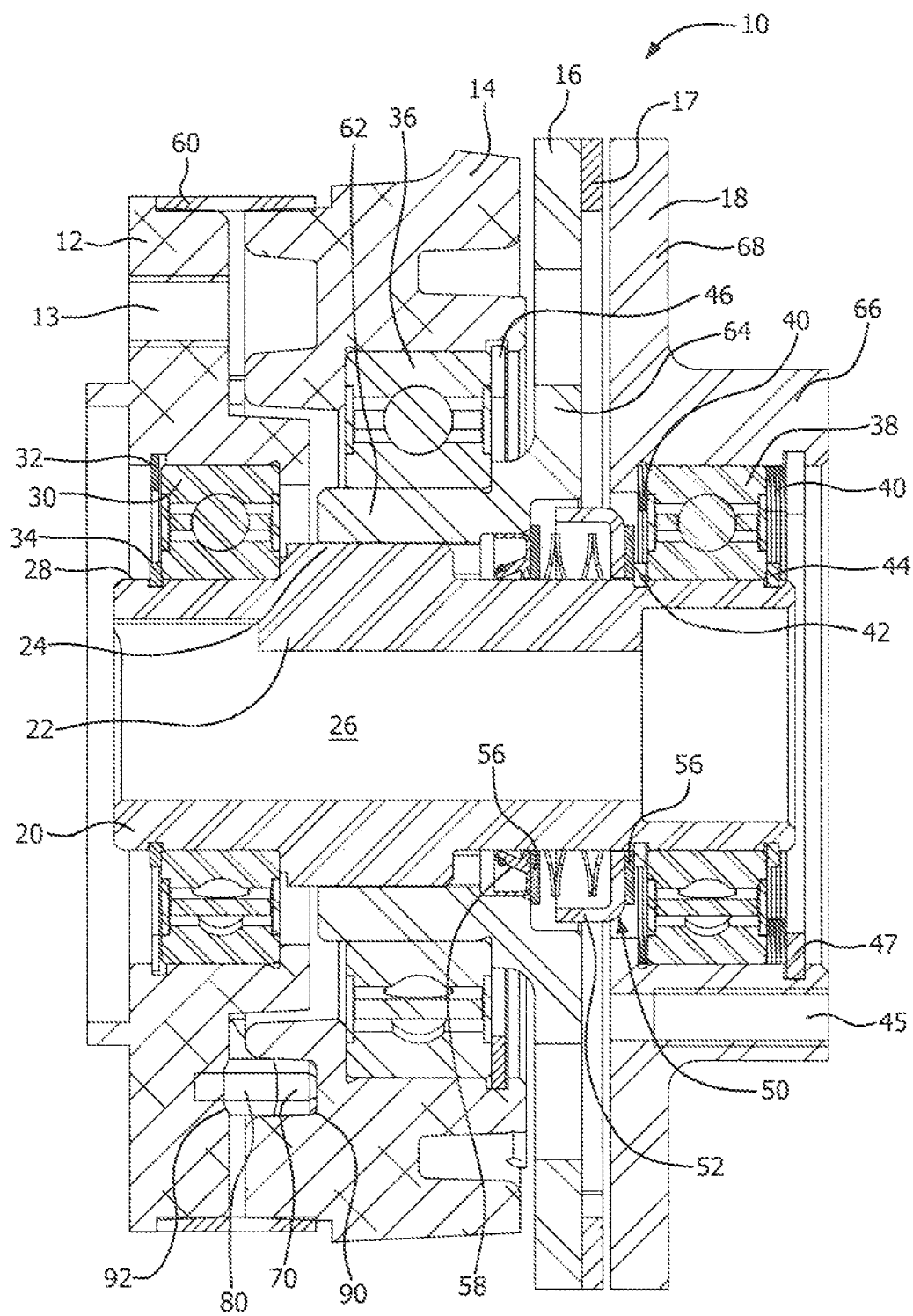
FIG. 1 is a cross-sectional view of an embodiment of a friction drive clutch.
Figure 5:
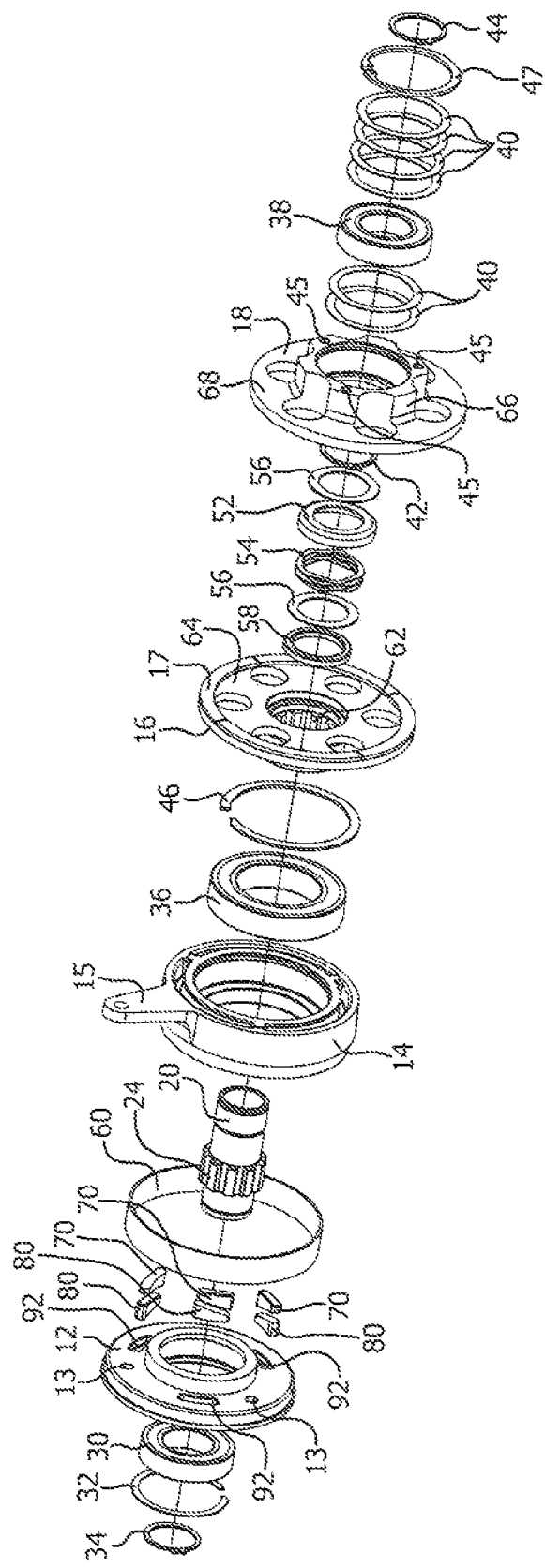
FIG. 5 is an exploded view of a friction drive clutch as in FIG. 1.

An embodiment of a friction drive clutch 10 is shown in cross-section in FIG. 1, and in exploded view in FIG. 5. The clutch 10 includes a hub 20 having an axis. The hub 20 is adapted to be rotated about its axis by a drive mechanism (not shown) such as an engine or transmission output shaft. In the depicted embodiment, the hub 20 includes a bore 26 having an internal key or splines 22 for engagement with an external groove or splines on a drive mechanism shaft (not shown) received into the bore 26, so that the drive mechanism shaft can move axially with respect to the hub 20 while causing the hub 20 to rotate with the drive mechanism shaft. Other conventional forms of engagement can be used for engaging the drive mechanism shaft to the hub.

A thrust plate 16 is positioned about a central portion of the hub 20. The thrust plate 16 includes a hub portion 62 and a flange portion 64 that extends radially outward from one end of the hub portion 62. An axially slidable connection between the hub portion 62 of the thrust plate 16 and the hub 20 enables the thrust plate 16 to engage the hub 20 such that the thrust plate 16 rotates with the hub 20 but is slidable in the axial direction with respect to the hub 20. In the depicted embodiment, the hub 20 includes external splines 24 along the central portion thereof, and the hub portion 62 of the thrust plate 16 includes mating internal splines 19. An annular friction member 17, such as an annular ring of material or a series of frictional pads arranged in an annular ring, each with a high coefficient of friction, are mounted to one face of the flange portion 64 of the thrust plate 16. In one embodiment, the frictional material is made from a non-asbestos metallic (non-ferrous) compound having a coefficient of friction of about 0.55. In another embodiment, powdered metal can be used as the friction material to obtain a coefficient of friction of about 0.65. It is also contemplated that the flange portion 64 may be formed from material having a high coefficient of friction and, as such, the friction member 17 may be a surface of the flange portion 64.

A first housing 12 is positioned to surround a portion of the hub 20 toward one end from the external splines 24. A bearing 30 enables the hub 20 to be rotatable with respect to the first housing 12. The bearing 30 is retained on the hub 20 between a shoulder of the hub and an external spring clip 34 that locks into a notch in the hub. The bearing is retained on the first housing 12 between a shoulder of the housing and an internal spring clip 32 that locks into a notch in the first housing 12. Other mechanisms can be readily used to retain the bearing between the hub and the first housing 12. The first housing 12 includes a plurality of bolt holes 13 for affixing the first housing 12 to a nonrotating part so that the first housing 12 is held stationary during operation of the clutch 10.

A second housing 14 is positioned with one side adjacent to the first housing 12. The second housing 14 surrounds the hub portion 62 of the thrust plate 16 and has another side adjacent to the flange portion 64 of the thrust plate 16. A bearing 36 positioned between the second housing 14 and the thrust plate 16 so as to enable the second housing 14 to rotate with respect to the thrust plate 16. The bearing 36 is retained on the thrust plate 16 by a shoulder of the thrust plate, and on the second housing 14 by a shoulder on the second housing and an internal spring clip 46 that engages a notch in the second housing 14. The bearing 36 is configured to transmit axial force between the second housing 12 and the thrust plate 16. An arm 15 extends radially outward from the second housing 14 for actuating the second housing 14 to rotate with respect to the first housing 12. When the clutch 10 is mounted in a device such as a power trowel, the arm 15 is actuated by a cable, lever, or other engagement mechanism that enables an operator to gradually or rapidly engage the clutch 10, as desired.

A third housing 18 is positioned to surround a portion of the hub 20 toward an opposite end from the external splines 24 from the first housing 12. The third housing 18 includes a hub portion 66 and a flange portion 68 that extends radially outward from one end of the hub portion 66. One face of the third housing 18 faces the friction member 17 of the thrust plate 16. A bearing 38 positioned between the third housing 18 and the hub 20 enables the third housing 18 to be rotatable with respect to the hub 20. The bearing 38 is retained on the hub 20 by a pair of external spring clips 42, 44, and on the third housing 18 by a shoulder on the third housing and an internal spring clip 47. Shims 40 may be positioned on either or both sides of the bearing 38, between the shoulder on the third housing 18 and one side of the bearing 38 and between the internal spring clip 47 and the other side of the bearing 38, to adjust the relative axial position of the third housing 18 with respect to the hub 20. The third housing 18 includes threaded bolt holes 45 so that the third housing 18 can be coupled to a driven mechanism (not shown).

Figure 8:
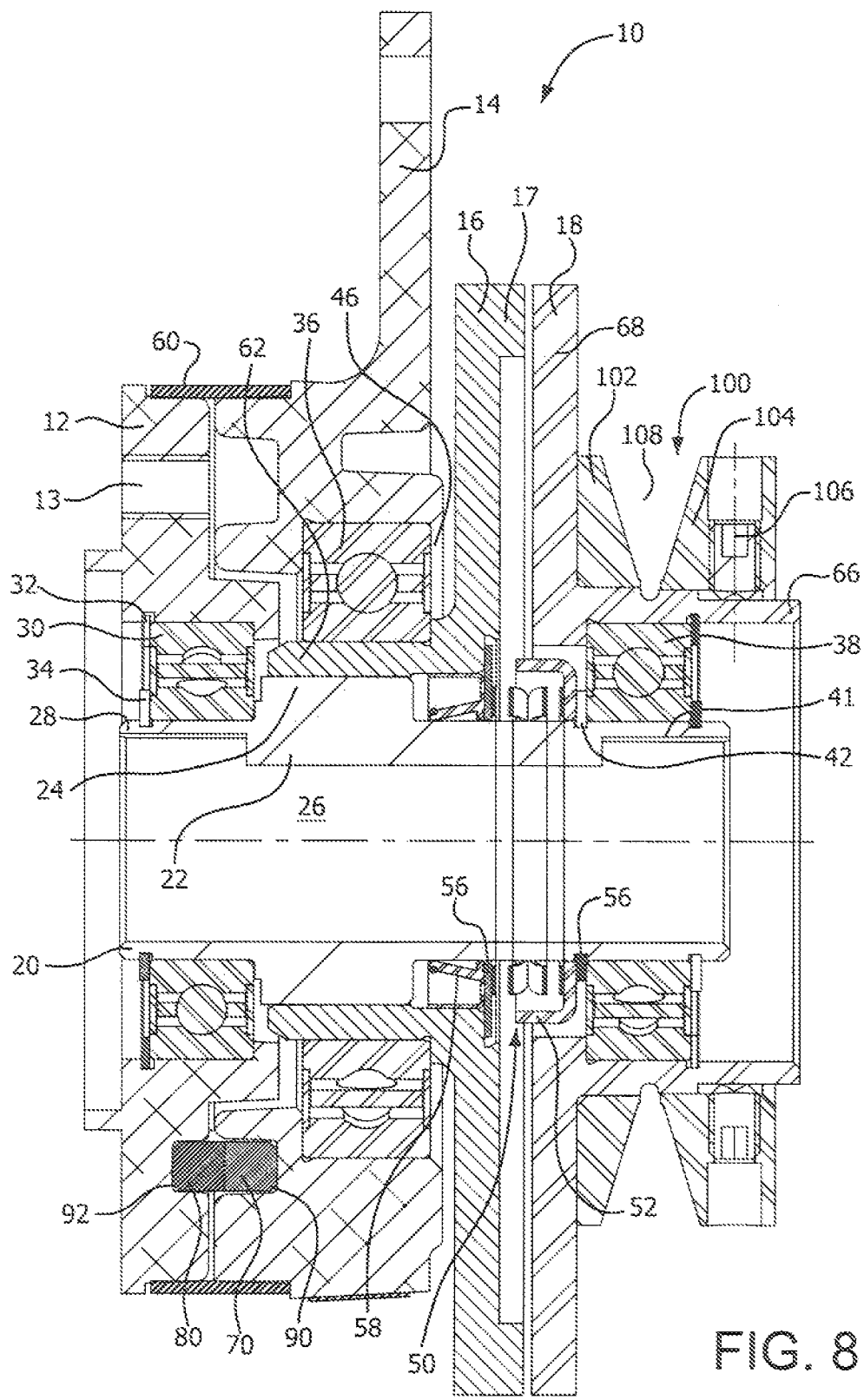
FIG. 8 is a cross-sectional view of another embodiment of a friction drive clutch having an adjustable sheave.
Figure 9:
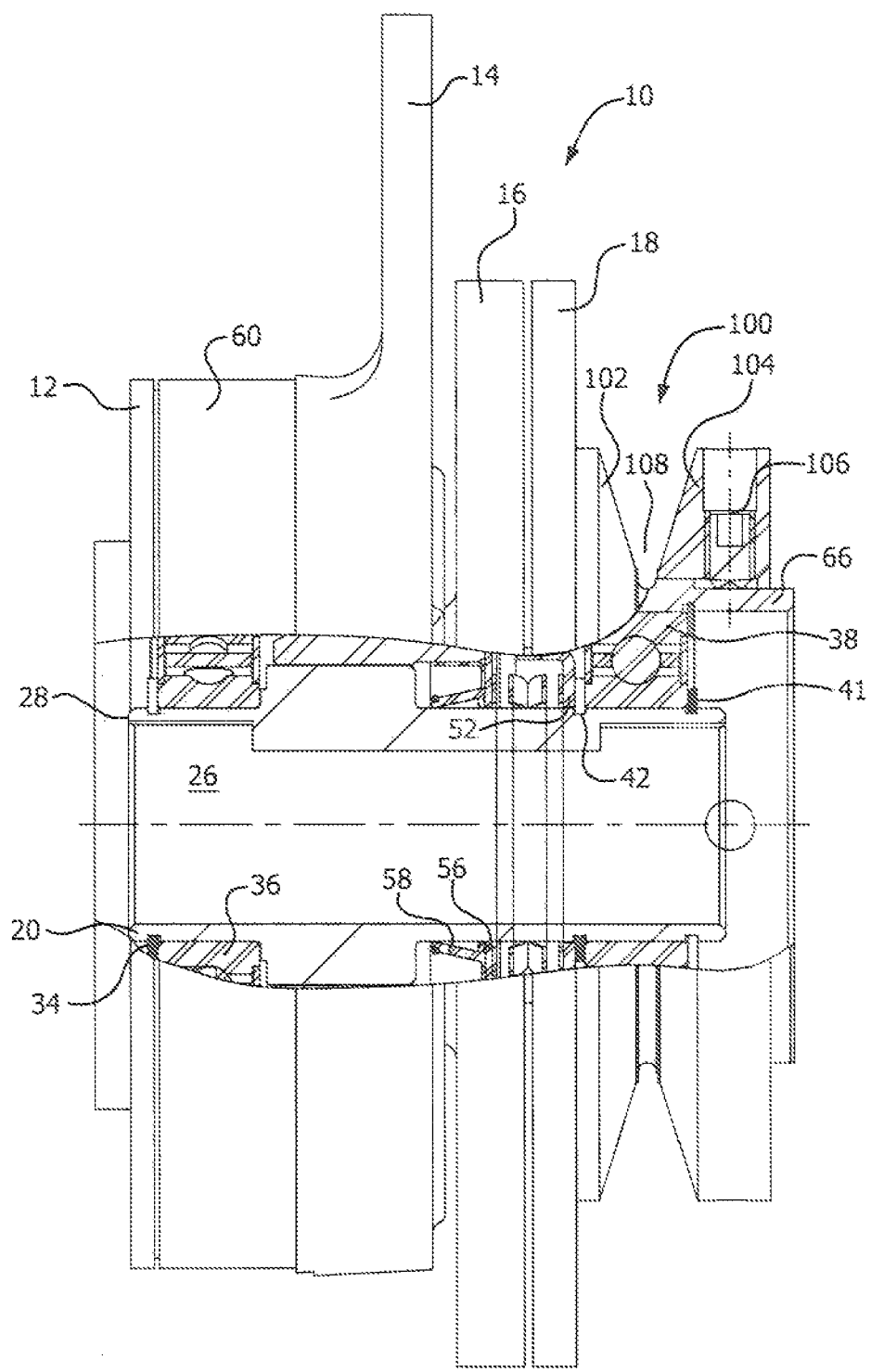
FIG. 9 is a partial cross-sectional view of a friction drive clutch as in FIG. 7.

The driven mechanism may be, but is not limited to, one or more of a sheave, a sprocket, and a keyed shaft. The driven mechanism may be removably engaged to the third housing 18, or may be integrally formed therewith. For example, FIGS. 8 and 9 show an embodiment of the clutch 10 having an adjustable sheave 100. The sheave 100 includes a first sheave member 102 separated from a second sheave member 104 by a gap 108 sufficient to receive an output belt. The first sheave member 102 is affixed to the third housing 18 while the second sheave member 104 is axially movable along the hub portion 66 of the third housing 18 so as to increase or decrease the width of the gap 108. The second sheave member 204 is secured in a desired position along the hub portion 66 by a set screw 106. Repositioning of the second sheave member 104 along the hub portion 66 changes the speed at which an output belt (not shown) is driven by the clutch 10 by causing the belt to move radially inward to a smaller diameter when the sheave members 102, 104 are farther apart (a slower driven speed) and radially outward to a larger diameter when the sheave members 102, 104 are closer together (a faster driven speed).

Another benefit of the adjustability of the second sheave member 204 is the ability to provide tensioning through the second sheave. In normal systems a separate tensioner is needed to accommodate belt stretching and changes in belt length. The present invention permits adjusting through the set screw 106 and the slidable second sheave member 204.

A spring assembly 50 is positioned about the hub 20 between the thrust plate 16 and the third housing 18 to urge the thrust plate 16 and the second housing 14 axially toward the first housing 12. The spring assembly 50 includes a spring cup 52 which houses a spring 54. The spring 54 may be a wave spring. One or more shims 56 may be positioned on either side of the spring assembly 50. In the illustrated embodiment, on one side of the spring assembly 50, a shim 56 is compressed between the spring cup 52 and the external spring clip 42 that is mounted in the hub 20, so that axial movement of the spring cup 52 is constrained with respect to the hub 20. On the other side of the spring assembly 50, a shim 56 is compressed between the wave spring 54 and a shoulder on the hub portion 62 of the thrust plate 16. An oil seal 58 may be positioned adjacent to the spring assembly 50 and the external splines 24 on the hub 20 so as to retain lubrication on the splines 24 and to prevent lubrication from reaching the friction member 17 and a face of the third housing 18 positioned to contact the friction member 17.

In the depicted embodiment, the first housing 12 includes three or more generally arc-shaped oval recessed cavities 92 each adapted to receive a ramped insert 80. Each ramped insert 80 preferably has a quadrilateral cross-section with a ramped or sloped surface, as shown in FIG. 6, and includes a rear face 80, side faces 86, 88 which may be oriented generally perpendicularly to the rear face 80, and a front contact face 84 that is sloped from parallel with respect to the rear face 80 such that the side face 86 is shorter than the side face 88. The slope of the contact face 84 is preferably between about 10° and about 30°, and in one embodiment is about 15°. The contact face 84 is preferably curved in a helical shape to increase the surface contact area and reduce the contact pressure. The ramped or sloped surfaces 84 has a contoured profile that may be substantially linear, but may alternatively be curved in a convex shape, a concave shape, or a complex shape that is a combination of greater and lesser slopes, in order to tailor the engagement of the clutch 10 as desired. Each insert 80 is received into a corresponding cavity 92 and rotates, or is held nonrotating, along with the first housing 12. In an alternate embodiment, the ramped inserts 80 may be integrally formed with the first housing 12.

In the depicted embodiment, the second housing 14 includes three or more generally arc-shaped oval recessed cavities 90 each adapted to receive a ramped insert 70. The cavities 90 of the second housing 14 are radially and circumferentially aligned with the cavities 92 of the first housing 12. Each ramped insert 70 preferably has a quadrilateral cross-section with a ramped or sloped surface, as shown in FIG. 6, and includes a rear face 70, side faces 76, 78 which may be oriented generally perpendicularly to the rear face 70, and a front contact face 74 that is sloped from parallel with respect to the rear face 70 such that the side face 76 is shorter than the side face 78. The contact face 74 preferably has a helical shape and slope to match the helical shape and slope of the contact face 84. The ramped or sloped surfaces 74 has a contoured profile that may be substantially linear, but may alternatively be curved in a convex shape, a concave shape, or a complex shape that is a combination of greater and lesser slopes, in order to tailor the engagement of the clutch 10 as desired. Each insert 70 is received into a corresponding cavity 90 and rotates, or is held nonrotating, along with the second housing 14.

Figure 7B:
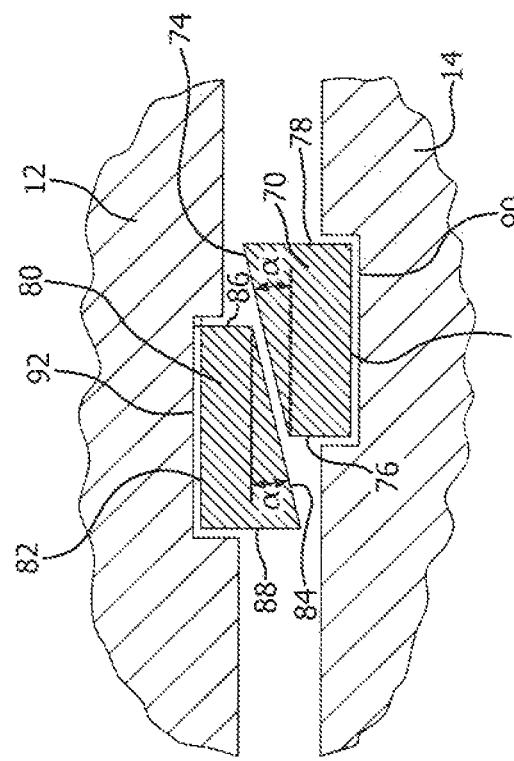
FIGS. 7A and 7B are cross-sectional views showing another embodiment of ramped members when a friction drive clutch as in FIG. 1 is in a disengaged position and an engaged position.
Figure 7A:
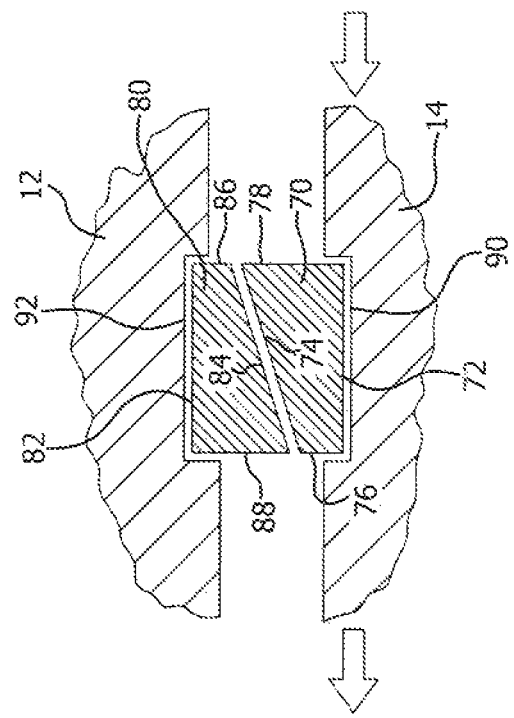

In the depicted embodiment of FIGS. 6A and 6B, the cavities 90 are deeper than the height of the side face 76 so that an upper lip 91 of the cavity 90 protrudes beyond a portion of the contact face 74. In another embodiment depicted in FIGS. 7A and 7B, the cavities 90 are of similar depth to the cavities 80, and a separate stop mechanism may be provided to limit the relative rotation of the first housing 12 and the second housing 14. In an alternate embodiment, the ramped inserts 70 may be integrally formed with the second housing 14. The ramped inserts 70 are mirror images of the ramped inserts 80, and are configured so that the sloped surfaces 74, 84 are substantially parallel and configured to mate while the rear surfaces 70, 80 remain parallel to each other. The inserts 70, 80 are made from a low friction material, such as sinter-bonded powdered metal, and are preferably lubricated with grease. Preferably the material of construction of the inserts 70, 80 is also very hard to minimize wear. In an alternative embodiment, rollers can be used in place of the ramps 70 or the ramps 80.

The second housing 14 is rotatable between two positions with respect to the first housing 12. The second housing 14 is urged toward a first or nonengaged position by the spring assembly 50. The second housing 14 resides in the nonengaged position when no or insufficient external torque is applied to the second housing 14 via the arm 15. In the nonengaged position, the friction member 17 of the thrust plate 16 is spaced apart from (and not in frictional contact with) the third housing 18. As the second housing 14 is rotated with respect to the first housing 12 toward the engaged position, the contact between the slope surfaces 74, 84 of the ramped inserts 70, 80 causes the friction member 17 to begin to come into contact with the third housing 18, and increase the force of contact up to a maximum amount of contact force when the second housing 14 is in the engaged position. When the hub 20 (and thus the thrust plate 16) is being rotated by the drive mechanism shaft, frictional engagement between the friction member 17 and the third housing 18 causes the third housing 18 (and thus the driven mechanism) to begin to rotate, and to eventually rotate in sync with the hub 20 when the clutch 10 is fully engaged.

An operator can control the speed and level of engagement of the clutch 10 by actuating the arm 15 to control how rapidly and how forcefully the friction member 17 and the third housing 18 come into frictional contact. Because of the mechanical advantage offered by the arm 15 (which extends outward from the axis of rotation of the second housing 14) and the relatively shallow slope α of the sloped surfaces 74, 84, a relatively low actuation force by an operator translates into a very high axial force engaging the friction member 17 with the third housing 18.

When the operator releases the arm 15, or a mechanism that actuates the arm 15, the clutch 10 rapidly disengages. Specifically, as soon as an actuating (rotational) force is removed from the arm 15, the compressed spring 54 expands, forcing the friction member 17 of the thrust plate 16 out of engagement with the third housing 18, and also moving the thrust plate 16 and the second housing 14 axially toward the first housing 12. The interface between the sloped faces 74, 84 of the ramped inserts 70, 80 causes the second housing 14 to rotate to the nonengaged position. If the device, such as a power trowel, was in use with its driven mechanism driving an external load, torque transfer to the external load almost instantly stops in the absence of a driving torque being applied to the third housing 18. Because the mechanism of rapid disengagement is inherent in the construction of the clutch 10 itself, this feature cannot be readily disabled or defeated by an operator.

A seal 60 preferably surrounds and overlaps a portion of the first housing 12 and a portion of the second housing 14. The seal 60 contacts each of the first housing 12 and the second housing 14. Frictional contact between the seal 60 and the housings 12, 14 works against relative movement of the second housing 14 with respect to the first housing 12 until a torque is applied to the second housing 14, and this frictional drag must be overcome (for example, via the arm 15) to rotate the second housing 14 with respect to the first housing 12.

Figure 3:
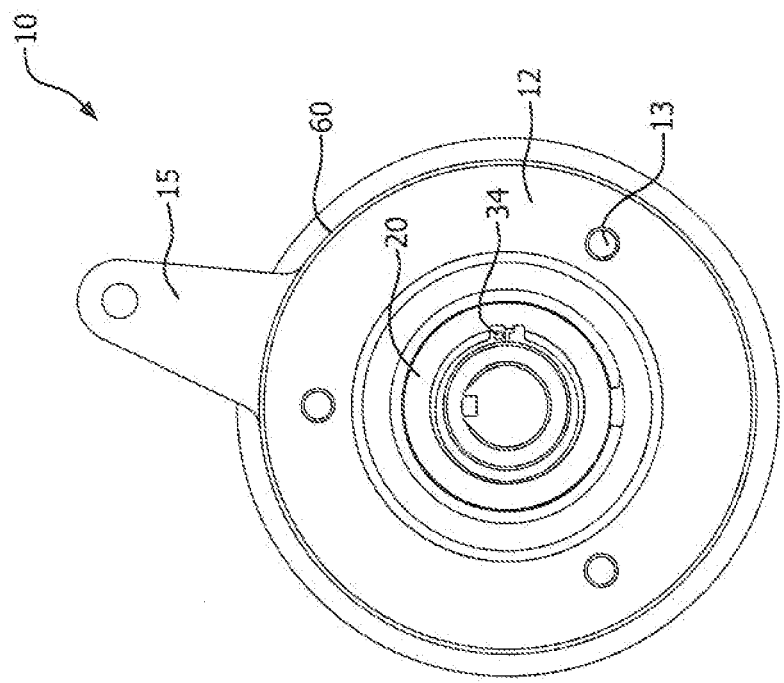
FIG. 3 is an end view of the left end of a friction drive clutch as in FIG. 1.
Figure 2:
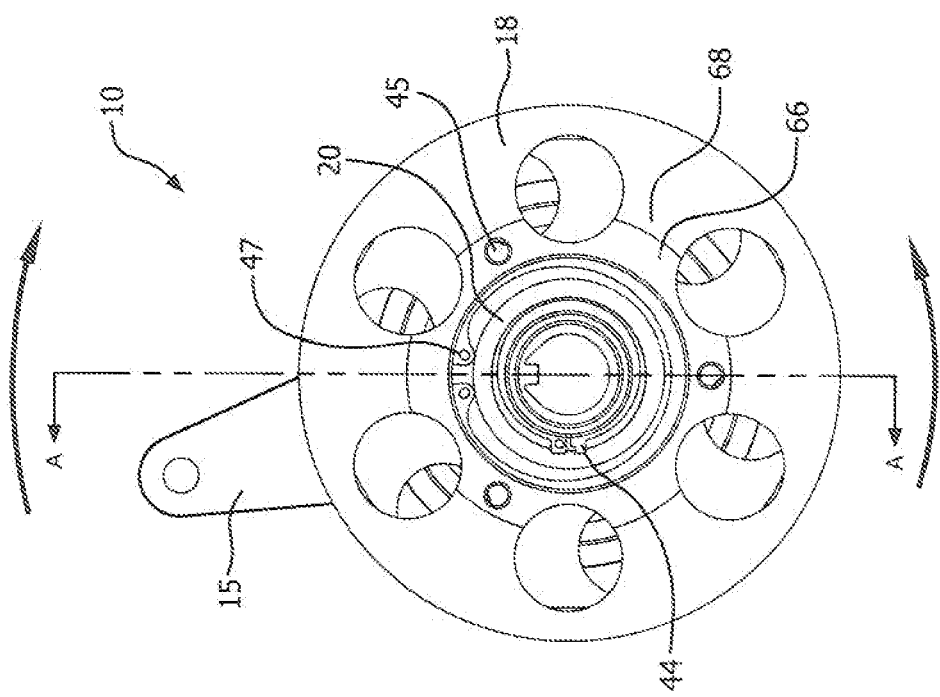
FIG. 2 is an end view of the right end of a friction drive clutch as in FIG. 1.
Figure 4:
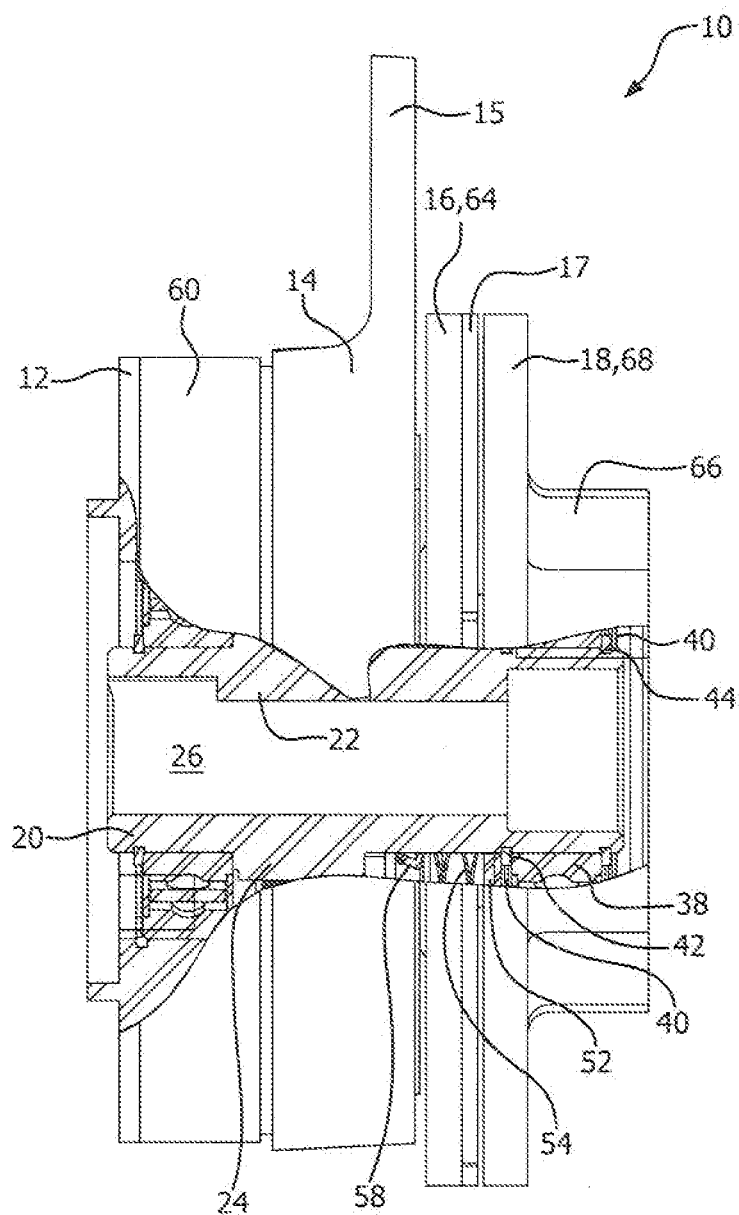
FIG. 4 is a partial cross-sectional side view of a friction drive clutch as in FIG. 1.

A partially cut-away side view of the assembled clutch 10 is shown in FIG. 4, an end view from the driven end (i.e., from the third housing 18) is shown in FIG. 2, and an end view from the drive end (i.e., from the first housing 12) is shown in FIG. 3.

In use, the clutch 10 is mounted in a device having a drive mechanism shaft that is received into the bore 26 of the hub 20 so as to cause the hub 20 to rotate with the drive mechanism shaft. The first housing 12 is secured via the bolt holes 13 to a nonrotating part of the device so that the first housing 12 remains nonrotating when the hub 20 is rotated. A torque arm may be affixed to the first housing 12 to help the first housing 12 resist rotation. A driven mechanism shaft is mounted to the third hub 18 via the bolt holes 45 so that the third housing 18 causes the driven mechanism to rotate along with the third housing 18.

In the absence of a torque applied to the second housing 14 via the arm 15, the spring assembly 50 biases the thrust plate 16 and the second housing 14 toward the first housing 12, such that the second housing 14 is in the nonengaged position. In addition, the frictional drag created by the bearing 36 further biases the second housing 14 to the nonengaged position relative to the first housing 12. The relative rotational orientation of the first housing 12 and the second housing 14 can be described with reference to FIG. 6A, which shows that the respective ramped members 70, 80 are aligned with the side face 88 of the ramped member 80 resting against the upper lip 91 of the cavity 90. The protruding upper lip 91 of the cavity 90 acts as a stop to prevent further rotation of the second housing 14 with respect to the first housing 12 in the disengaging direction. In this configuration, there is little or no force between the inclined faces 74, 84 and the wave spring 54 is completely or nearly completely decompressed. When the drive mechanism shaft rotates, causing the hub 20 to rotate, the thrust plate 16 rotates in conjunction with the hub 20. The first housing 12 rides on the bearing 30 and is held nonrotating by its mounting to a nonrotating part of the device. The combination of the friction exerted by the seal 60 on the first housing 12 and the second housing 14, and the friction of the bearing 36, maintains the relative rotational orientation between the first housing 12 and the second housing 14, and keeps the second housing 14 from rotating with respect to the first housing 12. A gap exists between the friction member 17 of the thrust plate 16 and the third housing 18 (i.e., the friction member 17 does not contact the third housing 18), and consequently, the third housing 18 rides on the bearing 38 and, along with the driven mechanism, remains nonrotating.

When a torque is applied to the second housing 14 via the arm 15 in a rotational direction to cause the ramped inserts 70, 80 to come into more forceful engagement, or more specifically, for the sloped face 74 of ramped insert 70 to slide up the sloped face 84 of ramped insert 80, generating an axial force between the inclined faces 74, 84. The farther the relative rotation of the second housing 14 with respect to the first housing 12, the more ramped insert 70 slides up ramped insert 80, and the greater the axial force between the inclined faces 74, 84, until the second housing 14 reaches the engaged position shown in FIG. 6B.

As the ramped insert 70 slides up ramped insert 80 when the second housing 14 is being rotated with respect to the first housing 12 from the nonengaged position to the engaged position, since the first housing 12 is axially fixed, the axial force generated between the inclined faces 74, 84 causes the second housing 14, and thus the thrust plate 16, to move axially away from the first housing 12 and toward the third housing 18. This axial displacement causes the friction member 17 to begin to contact the third housing 18, and the frictional engagement between the friction member 17 (which is rotating along with the thrust plate 16) and the third housing 18 begins to cause the third housing 18 and the driven mechanism to rotate. Once the second housing 14 has reached the engaged position, there is sufficient frictional force between the friction member 17 and the third housing 18 that the two rotate essentially as one (allowing for slight slippage as might occur in any clutch mechanism), and the drive mechanism shaft is essentially rotationally coupled to the driven mechanism.

The force applied between the friction member 17 and the third housing 18 can be adjusted by several mechanisms as required depending on the driven load and to accommodate wear of one or both of the friction member 17 and the third housing 18. For example, the axial position of the third housing 18 can be adjusted by adding or removing shims 40 on either side of the third housing 18, the axial position of the second housing 14 and the thrust plate 16 can be adjusted by adding or removing shims 56 on either side of the spring assembly 50, the compression of the wave spring 54 can be adjusted by the relative locations and thicknesses of the shims 56 on either side of the spring assembly 50, and the force of engagement between the friction member 17 and the third housing 18 can be adjusted by varying the thickness and/or slope angle α of the ramped members 70, 80.

The clutch 10, by its design, includes an inherent safety feature that rapidly shuts off torque input to the driven mechanism shaft in the event an operator becomes disabled. Specifically, to maintain rotational coupling between the drive mechanism shaft and the driven mechanism shaft, an operator must exert a manual force to actuate the arm 15, which in turn exerts a torque on the second housing 14 to rotate the second housing 14 toward and/or into the engaged position with respect to the first housing 12. Rotation of the second housing 14 toward the engaged position with respect to the first housing 12 causes the second housing 14 and the thrust plate 16 to move axially toward the third housing 18 against the biasing force of the wave spring 54 in the spring assembly 50, so that the friction member 17 and the third housing 18 come into frictional engagement. But in the absence of a manual force to actuate the arm 15, no external torque is exerted on the second housing 14 and the biasing force of the wave spring 54 pushes the thrust plate 16 and the second housing 14 away from the third housing 16, causing the friction member 17 and the third housing 18 to come out of frictional engagement and the second housing 14 to rotate to the nonengaged position with respect the first housing 12. Therefore, whatever load is being applied to the driven mechanism will quickly cause the driven mechanism to slow down and stop, since no further torque is being supplied to the third housing 18 and the driven mechanism.

While the invention has been disclosed with reference to certain preferred embodiments, numerous modifications, alterations, and changes to the described embodiments are possible without departing from the sphere and scope of the invention, as defined in the appended claims and equivalents thereof. For example, while the disclosed embodiment includes a friction member or members on the flange portion of the thrust plate 16, it is also contemplated that the friction member 17 could be formed on the surface of the third housing 18 that faces the thrust plate 16. Also, while the second housing 14 is described as being rotatable with respect to the first housing, the rotation in that context need only be of a sufficient degree to cause the ramped surfaces to provide sufficient axial displacement. Accordingly, it is intended that the invention not be limited to the described embodiments, but that it have the full scope defined by the language of the following claims.

What is claimed is:

1. A friction drive clutch comprising:
   a hub adapted to be engaged with and rotated about an axis by a drive mechanism;
   a first housing surrounding a portion of the hub, the hub being rotatable relative to the first housing;
   a thrust plate engaging the hub so as to rotate with the hub and to be slidable with respect to the hub in the axial direction;
   a second housing surrounding a portion of the hub and located adjacent to the first housing, the thrust plate and the hub being rotatable with respect to the second housing, the second housing being rotatable with respect to the first housing, the second housing engaging the thrust plate so that the second housing and the thrust plate move axially together with respect to the hub during engaging and disengaging of the clutch;
   a third housing surrounding a portion of the hub and being rotatable with respect to the hub, the third housing being located adjacent to the thrust plate, the third housing being adapted to be engaged with and to rotate a driven mechanism;
   a spring assembly biasing the thrust plate and the second housing in the axial direction toward the first housing;
   at least two first ramped members extending axially from a surface of the first housing, each first ramped member having a sloped axial face; and
   at least two second ramped members extending axially from a surface of the second housing toward the first ramped members, each second ramped member having a axial sloped face, each second ramped member being at least partially aligned with a corresponding one of the first ramped members;
   the first housing including at least two cavities, each cavity removably receiving one of the first ramped members; and
   the second housing including at least two cavities, each cavity removably receiving one of the second ramped members;
   wherein when the second housing is rotated in one direction with respect to the first housing, the sloped faces of the second members directly contact and slide along the sloped faces of the corresponding first members to urge the second housing in the axial direction away from the first housing, thereby causing the thrust plate to move axially into frictional engagement with the third housing, the axial movement of the thrust plate and the rotation of the second housing in the one direction being opposed by the biasing of the spring assembly.

2. The clutch of claim 1, wherein the axial sloped faces of the first and second ramped members are sloped at an angle of about 10° to about 30°.

3. The clutch of claim 1, wherein the spring assembly includes a wave spring.

4. The clutch of claim 1, further comprising a bearing located between the second housing and the thrust plate to enable the second housing to rotate with respect to the thrust plate and to move axially with the thrust plate.

5. The clutch of claim 1, further comprising a friction member on the thrust plate for contacting the third housing.

6. The clutch of claim 1, wherein the hub and the thrust plate are engaged via a splined connection.

7. The clutch of claim 1, wherein the spring assembly is located between the third housing and the thrust plate.

8. The clutch of claim 7, wherein one side of the spring assembly engages the hub and an opposite side of the spring assembly engages the thrust plate.

9. The clutch of claim 1, wherein the driven mechanism includes an adjustable sheave mounted on the third housing, the adjustable sheave configured to be slid axially on the third housing for permitting adjustments for speed and/or tensioning of a belt.

10. A friction drive clutch comprising:

a hub having an axis;

a thrust plate configured to rotate with the hub and to be axially slidable with respect to the hub;

a first housing configured to be rotatable with respect to the hub, the first housing including at least two first ramped members each having an axial sloped face;

a second housing configured to be rotatable with respect to the thrust plate and to move axially together with the thrust plate, the second housing including at least two second ramped members each having an axial sloped face, the second housing being positioned such that each second ramped member is at least partially aligned with a corresponding one of the first ramped members;

a third housing configured to be rotatable with respect to the hub; and a spring assembly urging the thrust plate and the second housing axially toward the first housing;

wherein when the second housing is rotated in one direction with respect to the first housing, the sloped faces of the second members directly contact and slide along the sloped faces of the corresponding first members to urge the second housing in the axial direction away from the first housing, thereby causing the thrust plate to move axially from a position in which the third housing is free to rotate relative to both the hub and the first housing into frictional engagement with the third housing, the axial movement of the thrust plate and the rotation of the second housing in the one direction being opposed by the spring assembly.

11. The clutch of claim 10, wherein the first ramped members are integrally formed with the first housing; and wherein the second ramped members are integrally formed with the second housing.

12. A friction drive clutch comprising:

a hub adapted to be engaged with and rotated about an axis by a drive mechanism;

a first housing surrounding a portion of the hub, the hub being rotatable relative to the first housing;

a thrust plate engaging the hub so as to rotate with the hub and to be slidable with respect to the hub in the axial direction;

a second housing surrounding a portion of the hub and located adjacent to the first housing, the thrust plate and the hub being rotatable with respect to the second housing, the second housing being rotatable with respect to the first housing, the second housing engaging the thrust plate so that the second housing and the thrust plate move axially together with respect to the hub during engaging and disengaging of the clutch;

a third housing surrounding a portion of the hub and being rotatable with respect to the hub, the third housing being located adjacent to the thrust plate, the third housing being adapted to be engaged with and to rotate a driven mechanism;

a spring assembly biasing the thrust plate and the second housing in the axial direction toward the first housing;

the first housing having a surface including at least two cavities, each cavity removably receiving one of at least two first members extending axially from said surface of the first housing; and the second housing having a surface including at least two cavities, each cavity removably receiving one of at least two second members extending axially from said surface of the second housing toward the first members, each second member being at least partially aligned with a corresponding one of the first members;

wherein a sloped axial face is formed on at least one of each first member and each second member for contacting a face on the corresponding other member; and wherein when the second housing is rotated in one direction with respect to the first housing, the second members directly contact and slide over the corresponding first members to urge the second housing in the axial direction away from the first housing, thereby causing the thrust plate to move axially into frictional engagement with the third housing, the axial movement of the thrust plate and the rotation of the second housing in the one direction being opposed by the biasing of the spring assembly.

13. A friction drive clutch comprising:

a hub having an axis;

a thrust plate configured to rotate with the hub and to be axially slidable with respect to the hub;

a first housing configured to be rotatable with respect to the hub;

a second housing configured to be rotatable with respect to the thrust plate and to move axially together with the thrust plate;

a third housing configured to be rotatable with respect to the hub; and a spring assembly urging the thrust plate and the second housing axially toward the first housing;

wherein one of the first housing and the second housing includes at least two sloped surfaces, and the other of the first housing and the second housing includes an axial surface configured to slide directly on the sloped surfaces;

wherein when the second housing is rotated in one direction with respect to the first housing, the axial surface of the other of the first housing and the second housing slides along the sloped surfaces of the one of the first housing and the second housing to urge the second housing in the axial direction away from the first housing, thereby causing the thrust plate to move axially from a position in which the third housing is free to rotate relative to both the hub and the first housing into frictional engagement with the third housing, the axial movement of the thrust plate and the rotation of the second housing in the one direction being opposed by the spring assembly.

* * * * *